May 30, 1939.  R. M. PARSONS  2,159,979
REMOTE CONTROLLED PRESSURE RELIEF VALVE
Filed July 15, 1938   2 Sheets-Sheet 1
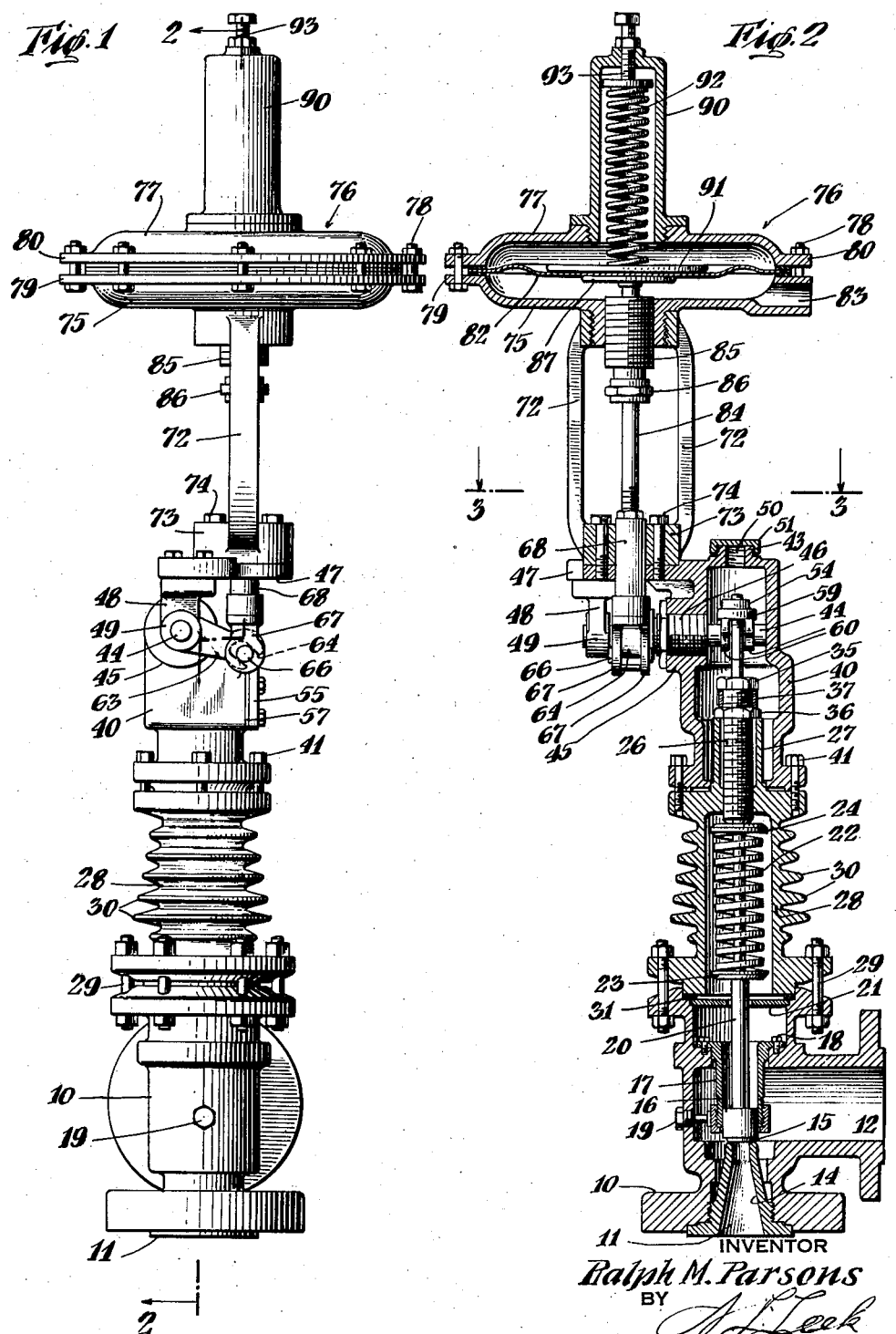
INVENTOR
Ralph M. Parsons
BY
ATTORNEY

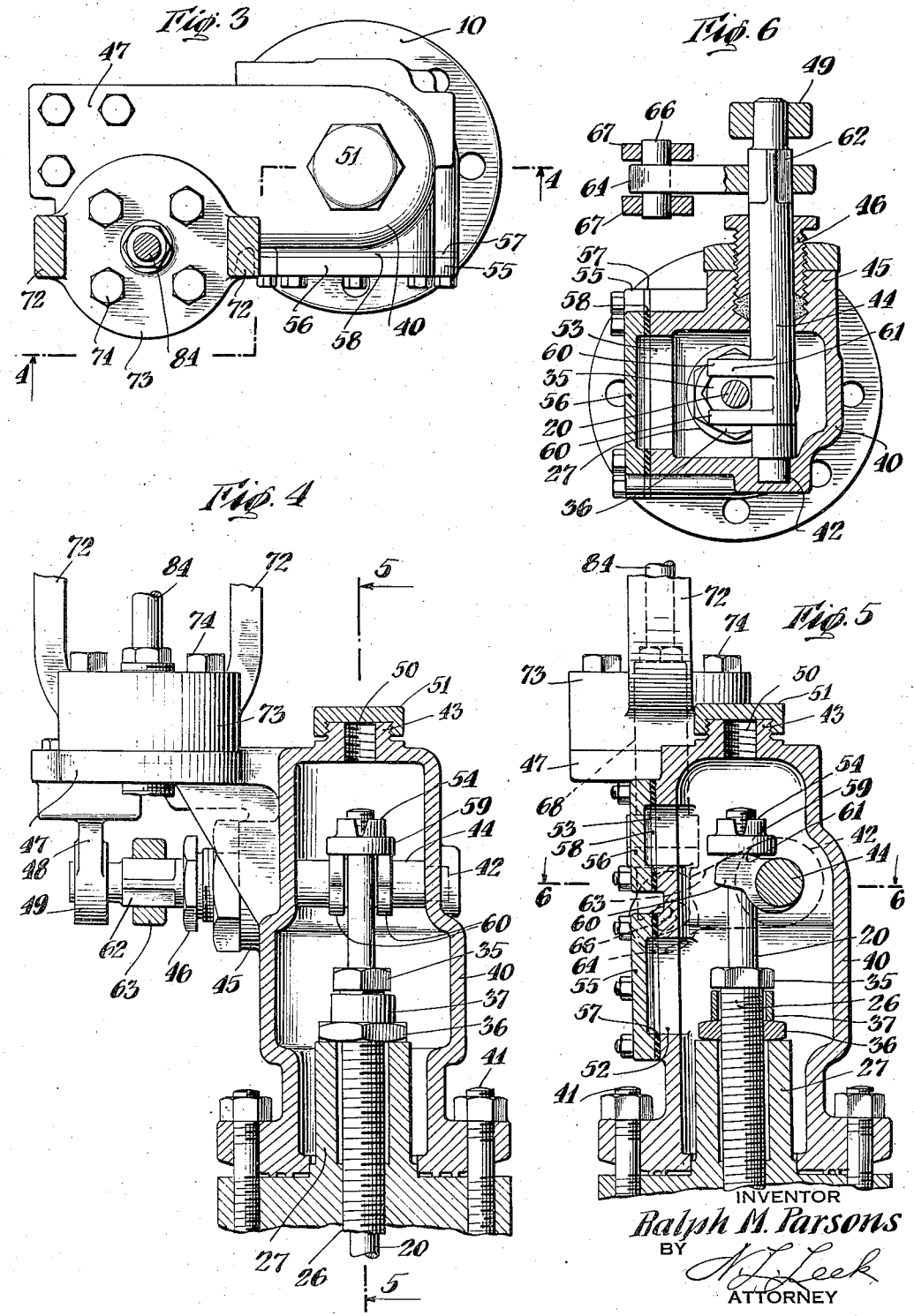

Patented May 30, 1939

2,159,979

UNITED STATES PATENT OFFICE 2,159,979

REMOTE CONTROLLED PRESSURE RELIEF VALVE

Ralph M. Parsons, Los Angeles, Calif., assignor to Bechtel-McCone-Parsons Corporation, Los Angeles, Calif., a corporation of Nevada Application July 15, 1938, Serial No. 219,308

3 Claims. (Cl. 137—139)

This invention relates to remote controlled, pressure relief valves and has for an object to provide a valve which combines in a single unit the functions of a pressure relief valve and of a remote controlled, manually operated valve.

Another object is to provide a valve of the above type which may be actuated by fluid pressure from a remote point for relieving the pressure in or for emptying a vessel and which is also adapted to operate automatically in response to an excess pressure in the vessel.

Another object is to provide a fluid pressure actuating mechanism which operates efficiently for the purpose above mentioned without interfering with the normal automatic actuation of the valve for pressure relief purposes.

Various other objects and advantages will be apparent as the nature of the invention is more fully disclosed.

This application is a continuation-in-part of my co-pending application Ser. No. 97,088, filed August 21, 1936.

The various novel features which are believed to be characteristic of this invention are pointed out more particularly in the claims appended hereto. The invention will be better understood, however, by referring to the following description, taken in connection with the accompanying drawings, in which a certain specific embodiment thereof has been set forth for purposes of illustration.

In the drawings:

Fig. 1 is a side elevation of a pressure relief valve embodying the present invention;

Fig. 2 is a vertical section taken on the line 2—2 of Fig. 1;

Fig. 3 is a horizontal section taken on the line 3—3 of Fig. 2;

Fig. 4 is a vertical section taken on the line 4—4 of Fig. 3 showing the support for the fluid pressure motor;

Fig. 5 is a vertical section taken on the line 5—5 of Fig. 4 showing the inspection and adjusting ports; and Fig. 6 is a horizontal section taken along the line 6—6 of Fig. 5.

In the following description and in the claims, certain terms are used for convenience in referring to various details of the invention. It is to be understood, however, that these terms are to be given as broad an interpretation as the state of the art will permit.

Referring to the drawings more in detail, the valve is shown as comprising a housing 10 (Figs. 1 and 2) having an inlet port 11 and an outlet port 12 communicating through a valve orifice 14 having a seat 15 engaged by a valve member 16. The valve member 16 is slidably mounted in a bushing 17 which is attached by screws 18 and 19 to the housing 10 and is carried on a valve stem 20 which extends upwardly through a bushing 21 and carries a spring 22 which is seated between a disc 23 attached to said stem and a disc 24 which is engaged by a sleeve 26. The sleeve 26 is threaded into an extension 27 formed on a bonnet 28 which surrounds the stem 20 and spring 22 and is bolted, as by bolts 29, to the housing 10. The bonnet 28 is shown as provided with cooling fins 30 and as seated on a washer 31 which is carried by the housing 10 and provides a fluid tight seal therefor.

The sleeve 26 is provided with an adjusting nut 35 and a lock nut 36 by which the position thereof in the bonnet 28 may be adjusted. A shim 37 may be provided between the adjusting nut 35 and the lock nut 36 to form a stop and limit the extent of downward adjustment of said sleeve. The arrangement is such that the adjustment of the sleeve 26 varies the compression of the spring 22 and thereby varies the pressure at which the valve member 16 becomes unseated for pressure relief purposes.

The valve is also provided with a top bonnet 40 which may be bolted to the bonnet 28, as by bolts 41. The top bonnet 40 may comprise an integral casting having a bearing 42, Fig. 6, in which one end of a shaft 44 is journalled and having a boss 45 receiving a packing gland 46 through which the shaft 44 extends. The top bonnet 40 is also provided with a horizontally extending bracket 47 which is adapted to support the fluid pressure motor, to be described, and to which may be bolted a bracket 48 carrying a bearing member 49 in which the other end of the shaft 44 is journalled.

The top bonnet 40 may be provided with a port 52 to afford access to the adjusting nuts 35 and 36 by which the relief pressure may be adjusted, and with a port 53 to afford access to an adjusting nut 54 which is carried upon the upper end of the valve stem 20 and provides the adjustment for the fluid pressure motor linkage, to be described. The ports 52 and 53 may be closed by covers 55 and 56 respectively, which are held in fluid tight engagement with the top bonnet 28 by means of washers 57 and 58 respectively.

The top bonnet 40 may also carry a boss 43 having an internally threaded port 50 in which a rod (not shown) may be screwed to engage the stem 20 and hold the valve member 16 against its seat 15 for test purposes. This permits the vessel to be tested for pressures in excess of the relief pressure at which the valve normally opens, without the necessity for first dismantling or changing the setting of the valve itself. The port 50 may be closed by a cap 51 during normal operation of the valve.

The shaft 44 carries a pair of yokes 60, Figs. 5 and 6, having cam surfaces 61 which engage beneath a collar 59, secured by or forming a part of the adjusting nut 54 on the valve stem 20 and are adapted to elevate the valve stem when the shaft 44 is rotated. The portion of the shaft 44 between the boss 45 and the bearing member 49 is provided with a flattened section 62 to which an arm 63 is attached. The arm 63 is formed with a forked end 64, Fig. 5, which engages a pin 66 held between yokes 67, Fig. 2, carried by a rod 68.

Brackets 72 are formed on a block 73 which is attached, as by bolts 74, to the bracket 47 and carries at its upper end a lower housing 75 of a fluid pressure motor 76. The motor 76 is formed by an upper housing 77, which is attached to the lower housing 75, as by bolts 78 extending through peripheral flanges 79 and 80 formed on said housings 75 and 77 respectively. A diaphragm 82 is mounted between the flanges 77 and 78. The lower housing 75 is provided with a port 83 adapted to be connected to a suitable source of fluid pressure, such as a compressed air hose or the like.

The rod 68 is attached to a link 84 which extends through a bushing 85 threaded through the lower housing 75 and is provided with a stop nut 86 which limits the upper movement thereof. The link 84 is attached to the diaphragm 82 by any suitable means. In the embodiment shown, this link is provided with a head 87 which rests against the diaphragm 82.

A cap 90 is attached to the top housing 77 and carries a spring 92 which engages a disc 91 resting against the diaphragm 82. The disc 91 and the head 87 may be secured together, as by rivets, if desired, so as to provide a positive lift for the link 84 when the diaphragm 82 is flexed. The compression of the spring 92 may be adjusted by a set screws 93.

In the operation of the above described pressure relief valve, the valve is initially set by suitable adjustment of the adjusting nut 35 and the stop nut 36 to open when a predetermined pressure is applied to the port 11 and to thereby permit fluid to be discharged through the port 12 which may be connected to a suitable discharge line, not shown. The bonnet is normally closed to prevent escape of the fluid. The cover 55, however, may be removed when desired to afford access to the adjusting nut 35 for the purpose of making necessary adjustments of the relief pressure at which the valve operates.

The valve may also be opened from a remote point by supplying fluid pressure to the motor 76 through the port 83. This fluid pressure lifts the diaphragm 82, thereby lifting the link 84 and the rod 68. The yoke 67, attached to the rod 68, lifts the arm 63 and thereby causes a corresponding rotational movement of the shaft 44. Rotation of the shaft 44, through the yokes 60 and the collar 59, lifts the valve stem 20 and physically opens the valve. When the fluid pressure on the motor 76 is relieved, the spring 92 restores the parts to their initial position.

In the construction shown, the adjustment of the motor linkage may be varied by removing the cover 56, which affords access to the adjusting nut 54. It will be evident that this adjustment, and also the adjustment of the relief pressure, may be made without dismantling or removing the motor or the top bonnet. Furthermore, these two adjustments may be made independently of each other and without disturbing the setting of either the relief pressure or the motor linkage. The spring 92 is intended merely to return the parts after the fluid pressure has been relieved, although this spring may be used to bias the action of the diaphragm 82 if desired.

It will be noted that the diaphragm motor is entirely closed. Consequently, there is no free flow of fluid therethrough and the accumulation of moisture by condensation, when air is used as the source of fluid pressure, is eliminated. This is an important feature as it prevents the condensed moisture from freezing and interfering with the operation of the mechanism.

The bushing 17 is intended to seal the valve against escape of fluid to the bonnet. As a further precaution, the packing gland 46 closes the top bonnet 40. The valve is thus adapted to be used for pressure relief purposes on vessels containing inflammable or dangerous fluids and prevents escape of any vapors into the atmosphere.

It will be noted that the bracket 47, which is formed as an integral part of the top bonnet 40, supports the motor 76 and the shaft 44 by which the connection between the motor and the valve stem is made. The entire operating mechanism may accordingly be assembled as a unit apart from the valve itself and may be attached to the bonnet 28 in the field by a single set of bolts, namely, the bolts 41. The cost of installation is accordingly reduced and, in the event of replacement or repair, the cost and time required for removing the motor 76 and associated linkage is reduced to a minimum.

A valve of this type is primarily intended to be made in large sizes, suitable, for example, for use at the top of pressure vessels in oil cracking plants. It is evident, therefore, that the valve parts are comparatively expensive and that the reduction in number of parts or the use of a single valve for both pressure relief purposes and remote control purposes materially decreases the cost of installation and maintenance. Furthermore, the valve is so arranged that inspection and adjustment may be made without disturbing the motor and without releasing the pressure in the vessel to which the valve may be attached.

It is to be noted that the remote control means, in addition to permitting manual operation of the valve for the purpose of emptying the vessel or relieving the pressure therein, also provides means for intermittently operating the valve so as to maintain the valve in operating condition. This is an important feature because pressure relief valves remain inactive for long periods of time and tend to stick unless they are inspected and manually operated at frequent intervals. In an oil cracking plant, for example, the maintenance of pressure relief valves is extremely difficult due to their location on the tops of large towers. The remote control mechanism provides a convenient means for testing such valves at intervals as well as for operating them when desired for relieving the pressure in or emptying the vessels. While the valves are intended to be operated by compressed air, it is evident that other fluid pressure means may be substituted therefor if desired.

While a particular embodiment of the invention has been shown for purposes of illustration, it is to be understood that the invention is capable of various uses and that various changes and modifications may be made therein, as will readily appear to a person skilled in the art. The invention is only to be limited by the following claims when interpreted in view of the prior art.

What is claimed is:

1. A remote controlled pressure relief valve, comprising a housing having a valve member and a valve seat therein, a valve stem carrying said valve member, spring means tending to hold said valve member against said valve seat and permitting said valve member to be elevated for pressure relief purposes in response to excess pressure applied below said member, means to adjust the compression of said spring means for varying the relief pressure at which the valve is adapted to operate, a collar carried on said valve stem, a rotatable shaft journalled in said housing and having cam means engaging beneath said collar to lift said valve stem, means adjusting said collar with respect to said cam means, mechanical linkage means for actuating said shaft and a fluid pressure motor connected to actuate said mechanical linkage means, said housing having ports for inspection and adjustment registering with said spring adjusting means and said collar adjusting means, respectively, and covers normally closing said ports to provide a fluid tight housing.

2. A remote controlled pressure relief valve for an oil cracking plant, comprising a housing having a valve member and a valve seat therein, a valve stem carrying said valve member, spring means tending to hold said valve member against said valve seat and permitting said valve member to be elevated for pressure relief purposes in response to excess pressure applied below said member, a closed bonnet attached to said housing, means carried in said bonnet for adjusting the compression of said spring, an adjustable collar carried by said valve stem, a rotatable shaft pivotally mounted in said bonnet, cam members attached to said shaft and engaging beneath said collar to lift said valve stem when said shaft is rotated, said housing having ports arranged to afford access to both of said adjusting means, covers for said ports normally closing said bonnet to prevent escape of fluid therefrom, and a fluid pressure motor connected to actuate said shaft.

3. A remote controlled pressure relief valve for an oil cracking plant, comprising a housing having a valve member and a valve seat therein, a valve stem carrying said valve member, spring means tending to hold said valve member against said valve seat and permitting said valve member to be elevated for pressure relief purposes in response to excess pressure applied below said member, a bonnet attached to said housing and enclosing the upper end of said valve stem, a collar carried by said valve stem, a horizontal shaft journalled in said bonnet, said shaft having means engaging beneath said collar to lift said valve stem and extending outwardly beyond said bonnet, a horizontal bracket formed on said bonnet, said bracket having a bearing member engaging the outward end of said shaft, a fluid pressure motor supported on said bracket and linkage means connecting said motor to actuate said shaft for lifting said valve stem by remote control, said linkage means engaging said shaft between said bearing and said bonnet whereby said shaft is supported by said bracket against the bending moment produced by said linkage means.

RALPH M. PARSONS.